United States Patent

Weman

[11] 3,915,405
[45] Oct. 28, 1975

[54] MAGNETIC INERTIAL RETRACTOR

[75] Inventor: Per Olaf Weman, Haslah, Germany

[73] Assignee: Klippan GmbH Hamburg, Hamburg, Germany

[22] Filed: Nov. 26, 1974

[21] Appl. No.: 527,462

[52] U.S. Cl. ............................................. 242/107.4
[51] Int. Cl.² ....................................... B65H 75/48
[58] Field of Search............ 242/107.7, 107.4, 107.1; 280/150 SB; 297/386, 387, 388; 200/61.45 M, 61.52, 61.58 B; 307/10 SB

[56] References Cited
UNITED STATES PATENTS

| | | | |
|---|---|---|---|
| 2,732,149 | 1/1956 | Whittingham et al. ........... | 242/107.4 |
| 3,462,095 | 8/1969 | Hilsinger, Jr. et al. .......... | 242/107.7 |
| 3,596,849 | 8/1971 | Tamarin........................... | 242/107.7 |
| 3,790,098 | 2/1974 | Lewis............................... | 242/107.4 |
| 3,797,603 | 3/1974 | Loomba........................ | 200/61.45 M |

Primary Examiner—Leonard D. Christian
Attorney, Agent, or Firm—Ernest D. Buff; Jonathan Plaut

[57] ABSTRACT

A vehicle safety belt retractor is provided with a magnetically actuated arresting mechanism responsive to deceleration of the vehicle for moving a pawl into engagement with a ratchet wheel mounted on the retractor shaft to prevent protraction of the belt. The arresting mechanism includes first and second magnets, each being provided with a plurality of substantially equally spaced poles. The first magnet is fixedly mounted on the shaft. The second magnet is slidably mounted on the shaft for limited movement longitudinally of the shaft and angularly relative to movement of the first magnet and is adapted to move the pawl into engagement with the ratchet wheel.

9 Claims, 4 Drawing Figures

U.S. Patent   Oct. 28, 1975   3,915,405
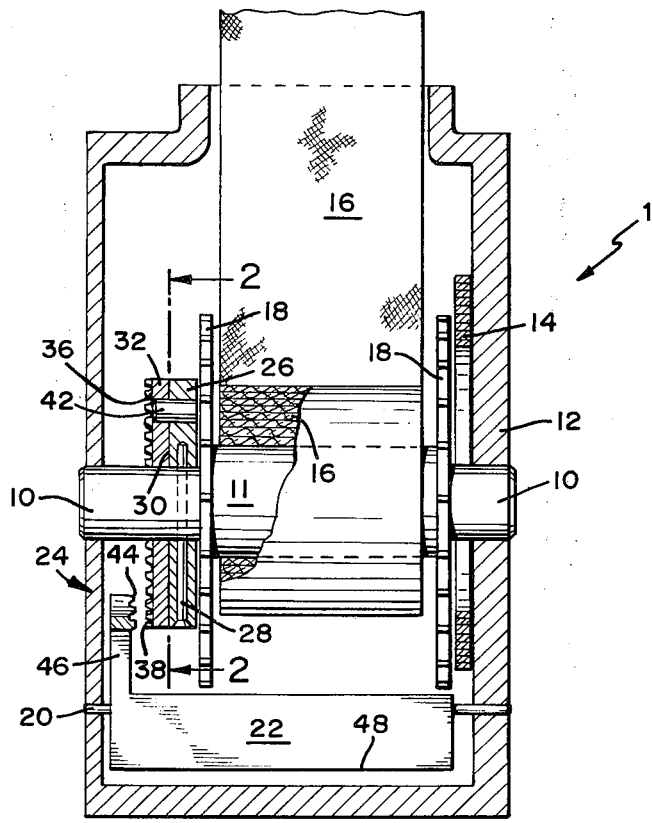
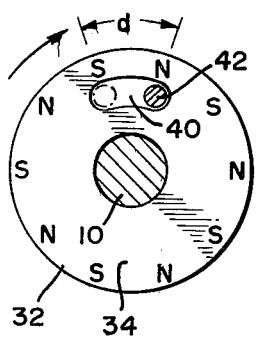
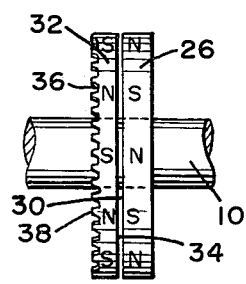
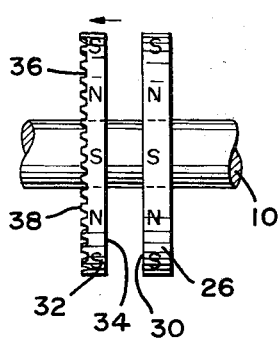

MAGNETIC INERTIAL RETRACTOR

BACKGROUND OF THE INVENTION

1. Field of the Invention

This invention relates to seat belt retractors for passengers in motor vehicles such as automobiles, and more particularly to an inertia responsive safety belt retractor having a magnetically acuated arresting mechanism which prevents protraction of the belt upon a rapid deceleration of the vehicle.

2. Description of the Prior Art

Inertia responsive safety belt retractor systems have been recently developed which should significantly decrease the number of fatalities and serious injuries resulting from motor vehicle accidents. Most of these retractor systems include a belt reel which is continuously biased in a retracting direction and an arresting mechanism having a blocking member which is normally maintained in a non-blocking position on the retractor by the force of a spring. When forces resulting from rapid deceleration of the vehicle are greater than the force of the spring, the blocking member moves from the non-blocking position to a blocking position which prevents further protraction of the belt. It is obviously of prime importance that the force exerted by the spring be correctly established and maintained at the magnitude necessary for proper actuation of the arresting mechanism. This requirement has, however, been difficult to meet. Problems inherent in the manufacture of such springs cause the force characteristics thereof to vary by a magnitude as high as 20 percent or more. As a result, each of the springs must be carefully tested and individually calibrated for use with the retractor. Moreover, the arresting mechanisms of spring actuated retractors are relatively complex and, unless regularly serviced, may become insufficiently reliable in operation when subjected to changing climatic operations for prolonged periods of time. For the above reasons, inertia retractors of the type described generally result in higher purchase and maintenance costs than are considered to be commercially acceptable.

SUMMARY OF THE INVENTION

The present invention provides an inertia responsive safety belt retractor having a magnetically actuated arresting means which is inexpensive to produce and highly reliable in operation. The retractor, adapted for incorporation of the magnetically actuated arresting means, comprises a support means; a shaft rotatably mounted on the support means and having a reel therein: a belt mounted on the reel for protraction and retraction with respect thereto; biasing means for urging the reel in a retracting direction; a ratchet wheel mounted on the shaft for rotation therewith; and a pawl pivotally mounted on the support means for engaging the ratchet wheel to stop rotation of the reel and thereby prevent protraction of the belt. The arresting means incorporated in the retractor is provided with a first magnet means provided with a plurality of substantially equally spaced poles and fixedly mounted on the shaft for rotation therewith; and a second magnet means provided with a plurality of substantially equally spaced poles and slidably mounted on the shaft for limited movement longitudinally of the shaft and angularly relative to movement of the first magnet means, for contacting the pawl to move the pawl into engagement with the ratchet wheel.

During normal operation of the retractor, the belt is protracted and retracted at a relatively constant rate. Each of the poles of the first magnet means is aligned with a pole on the second magnet means which has a polarity opposite thereto, and the first and second magnet means are held closely together by the resultant magnetic forces. The coefficient of friction between the shaft and the second magnet means has a magnitude sufficient to cause each of the first and second magnet means to move at subsantially the same angular velocity, and the ratchet means does not engage the pawl. Upon rapid deceleration of the vehicle, the first magnet means and the shaft are angularly displaced relative to the second magnet means until each of the poles of the first magnet means becomes aligned with a pole on the second magnet means which has a polarity equal thereto. The resultant magnetic forces displace the second magnet means longitudinally of the shaft until the ratchet means contacts the pawl and moves it into engagement with the ratchet wheel, thereby preventing further protraction of the belt.

The apparatus of this invention has advantageous structural features. Due to the large number of poles employed, the angular distance displaced by the first magnet means relative to the second magnet means in order to effect longitudinal movement of the latter is extremely small. Hence, the time interval required for actuation of the arresting means is minimized. The first and second magnetic means can be economically mass produced from non-corrosive materials. Once produced, the poles of the first and second magnet means retain their magnetic strength almost indefinitely. Thus, the force required for proper actuation of the arresting means can be precisely established without calibration and maintained without periodic maintenance, for a prolonged period of time. As a result the magnetically actuated inertial retractor of the present invention has higher reliability and lower purchase and maintenance costs than retractors which are inertially actuated against the force of a spring.

BRIEF DESCRIPTION OF THE DRAWINGS

The invention will be more fully understood and further advantages will become apparent when reference is made to the following detailed description and the accompanying drawings, in which:

FIG. 1 is a vertical section of the magnetic inertial retractor of this invention;

FIG. 2 is a section taken along the line 2—2 of FIG. 1;

FIG. 3 is a side elevation of a first and second heteropolar magnet means for use in the retractor of FIG. 1, the first magnet means having each of its poles aligned with a pole on the second magnet means having a polarity opposite thereto; and FIG. 4 is a side elevation of a first and second heteropolar magnet means for use in the retractor of FIG. 1, the first magnet means having each of its poles aligned with a pole on the second magnet means having a polarity equal thereto.

DETAILED DESCRIPTION OF THE DRAWINGS

Referring to FIGS. 1–4 of the drawings, there is illustrated one form of an inertia responsive safety belt retractor incorporating the magnetically actuated arresting means of this invention. Other forms of the retractor can also be used. The retractor, shown generally at 1, should therefore be interpreted as illustrative and not in a limiting sense. As illustrated, the retractor 1 has a shaft 10 rotatably mounted on a support means 12 and including a reel 11. The support means 12 is a load bearing member and is adapted to be bolted or otherwise secured to an anchorage point on the vehicle (not shown). A belt 16 formed of a flexible nylon web or the like, is attached to the reel 11 for protraction and retraction with respect thereto. The reel 11 is provided with a biasing means 14, such as a torsion return spring or the like, for continuously urging the reel 11 in a retracting direction. Fixedly mounted on the shaft 10 for rotation therewith is a ratchet wheel 18, the periphery of which has a plurality of circumferentially spaced ratchet teeth formed by closely spaced notches or slots. A pawl 22 is mounted on pivot 20 journaled on support means 12 for engaging the ratchet wheel 18 to stop rotation of shaft 10 and reel 11, thereby preventing further protraction of the belt 16. The pawl 22 is moved into engagement with the ratchet wheel 18 by an arresting means, shown generally at 24, which is responsive to acceleration of the vehicle. Each of the reel 10, support means 12, ratchet wheel 18 and pawl 22 is generally constructed of a suitable metal, such as heat treated steel or the like.

The arresting means 24 has a first magnet means 26 fixedly mounted to the shaft 10 by mechanical fastening means 28, such as rivets or the like, for rotation therewith. Outer surface 30 of first magnet means 26 is provided with a plurality of substantially equally spaced poles, as in the order of about 4 to 40 poles, and preferably about 12 to 24 poles. A second magnet means 32 is slidably mounted on shaft 10 and adapted for limited movement longitudinally of the shaft 10 and angularly relative to movement of the first magnet means 26. The second magnet means 32 has an inner surface 34 provided with substantially the same number and spacing of poles as the first magnet means 26, and an outer surface 36 provided with a ratchet means 38. In addition, the second magnet means 32 has a slot 40 therein within which bar 42 is contained. Bar 42 is fixedly connected to first magnet means 26 and is adapted for movement within slot 40 in a manner described hereinafter.

The bar 42 and slot 40 are so constructed that the maximum displacement distance of bar 42 within slot 40 equals substantially the angular displacement between adjacent poles on each of the first and second magnet means respectively. Typically the displacement distance of bar 42 is in the order of about 0.1 to 5 inches, and preferably about 0.35 inch. Longitudinal movement of second magnet means 32 is generally no greater than that sufficient to displace ratchet means 38 into and out of engagement with mating ratchet means 44 on arm 46 of pawl 22.

Each of the first and second magnet means 26 and 32 can be molded to the shape illustrated in the drawings and preferably is a ceramic ferrite permanent magnet formed of a magnetic material having a low permeability and a relatively high coercivity. A preferred type of magnetic material is barium ferrite. The first and second magnet means 26, 32 are magnetized to provide magnetized sectors (poles) having the polarity indicated in FIGS. 2–4. A magnetizing fixture is employed to permanently magnetize the ferrite composition into alternate opposite polarity sectors, thereby creating a heteropolar magnet. The magnetizer can be of a pulse type which is capable of magnetizing ferrite material.

It will be understood that the coefficient of friction extant between the shaft 10 and the second magnet means 32 can vary depending on the mass and diameter of the magnet means and the number, dimension and magnetic strength of the poles thereon. Typically, each of the first and second magnet means have a mass of about 50 to 1000 grams and a diameter of about 0.5 to 5 inches. The poles of the first and second magnet means 26 and 32 have substantially the same dimensions and are substantially equally spaced from about 9 to 45 apart on outer surface 30 and inner surface 34, respectively. The number of poles is preferably large as in the order of about 4 to 40 poles for a magnet having a circumference of about 1.5 to 15 inches. The coefficient of friction between the shaft 10 and the second magnet means ranges from about 0.1 to 0.7.

During normal operation of the retractor 1, belt 16 is protracted and retracted at a relatively constant rate. Each of the poles of first magnet means 26 is aligned (as shown in FIG. 3) with a pole on the second magnet means 32 which has a polarity opposite thereto, and the first and second magnet means are held closely together by the resultant magnetic forces. The coefficient of friction between the shaft 10 and the second magnet means 32 has a magnitude sufficient to cause each of the first and second magnet means 26 and 32 to move at substantially the same angular velocity, and the ratchet means 38 does not engage mating ratchet means 44 on arm 46 of pawl 22.

Upon rapid deceleration (e.g. collision) of the vehicle the first magnet means 26 and the shaft 10 are angularly displaced relative to the second magnet means 32. Bar 42 moves within slot 40 from its normal position to the position illustrated by phantom lines in FIG. 2. Each of the poles of first magnet means 26 are thereby aligned (as shown in FIG. 4) with a pole on second magnet means 32 which has a polarity equal thereto. The resultant magnetic forces displace the second magnet means 32 longitudinally of shaft 10 in the direction of the arrow (FIG. 4) until ratchet means 38 contacts mating ratchet means 44 on arm 46 of pawl 22. Rotary movement imparted to second magnet means 32 by bar 42 in slot 40 is translated through ratchet means 38 and 44 to arm 46. The arm 46 moves away from its normal position (shown in FIG. 1) directing blocking portion 48 of pawl 22 into engagement with ratchet wheel 18, thereby preventing further protraction of the belt 16.

Having thus described the invention in rather full detail it will be understood that these details need not be strictly adhered to but that various modifications may suggest themselves to one skilled in the art, all falling within the scope of the invention as defined by the subjoined claims.

I claim:

1. A safety belt retractor, comprising:
   a. a support means;
   b. a shaft rotatably mounted on the support means and having a reel thereon;
   c. a belt mounted on said reel for protraction and retraction with respect thereto;
   d. biasing means for urging said reel in a retracting direction;
   e. a ratchet wheel mounted on said shaft for rotation therewith;
   f. a pawl pivotally mounted on said support means for engaging said ratchet wheel to stop rotation of said reel and thereby prevent protraction of said belt; and g. an arresting means responsive to deceleration of said vehicle and including (1) first magnet means provided with a plurality of substantially equally spaced poles and fixedly mounted on said shaft for rotation therewith and (2) second magnet means provided with a plurality of substantially equally spaced poles and slidably mounted on said shaft said second magnet means being adapted for limited movement longitudinally of said shaft and angularly relative to movement of said first magnet means and for contacting said pawl to move said pawl into engagement with said ratchet wheel.

2. A safety belt retractor as recited in claim 1, wherein said pawl includes an arm having mating ratchet means thereon and said second magnet means includes ratchet means, adapted for displacement into and out of engagement with said mating ratchet means, thereby moving said pawl into engagement with said ratchet wheel.

3. A safety belt retractor as recited in claim 2, wherein each of said first and second magnet means has substantially the same number of poles.

4. A safety belt retractor as recited in claim 3, wherein the number of poles in each magnet means ranges from about 4 to 40.

5. A safety belt retractor as recited in claim 1, wherein each of said first and second magnet means is composed of barium ferrite.

6. A safety belt retractor as recited in claim 3, wherein said second magnet means has a slot therein and said first magnet means is fixedly connected to a bar, said bar being adapted for displacement within said slot.

7. A safety belt retractor as recited in claim 6, wherein the displacement distance of said bar within said slot equals substantially the distance between adjacent poles on said second magnet means.

8. A safety belt retractor as recited in claim 4, wherein each of said first and second magnet means has a circumference of about 1.5 to 15 inches and a mass of about 50 to 1000 grams.

9. A safety belt retractor as recited in claim 8, wherein the coefficient of friction between said second magnet means and said shaft is about 0.1 to 0.7.

* * * * *